United States Patent [19]
Zandi

[11] Patent Number: 5,937,369
[45] Date of Patent: Aug. 10, 1999

[54] THERMAL ENERGY APPARATUS AND METHODOLOGY

[75] Inventor: Bahram Zandi, Troy, Mich.

[73] Assignee: Thermal Engineering Services, Inc., Troy, Mich.

[21] Appl. No.: 08/789,244

[22] Filed: Jan. 28, 1997

[51] Int. Cl.[6] .................................................. G01K 11/00
[52] U.S. Cl. .......................................... 702/130; 702/196
[58] Field of Search ..................................... 364/578, 557, 364/488, 491, 806, 468.24; 702/130, 134, 136, 196

[56] References Cited

U.S. PATENT DOCUMENTS

| 5,583,780 | 12/1996 | Kee et al. | 364/468.24 |
| 5,604,687 | 2/1997 | Hwang et al. | 364/578 |

OTHER PUBLICATIONS

Incropera et al., Fundamentals of Heat and Mass Transfer, 1985, pp. 638–643, $2^{nd}$ Edition, John Wiley & Sons.

Siegel et al., Thermal Radiation Heat Transfer, 1981, pp. 172–201, $2^{nd}$ Edition, Hemisphere Publishing Corporation.

Primary Examiner—Kamini Shah
Attorney, Agent, or Firm—Chupa & Alberti, P.C.

[57] ABSTRACT

A thermal energy apparatus and methodology 10 including a computer 12, operating under stored program control, to selectively allow elements 26 and 28 to be created and partitioned and to further allow the partitioning to be dispensed with upon calculating the radiation aspect of the thermal model. The thermal calculation and measurement apparatus and methodology can further include a means for allowing elements 102–108 to be created and thereafter allow an amorphous potting solution or other model wide elements 120 to be integrated into the model without detrimentally affecting the previously created elements 102–108.

1 Claim, 3 Drawing Sheets

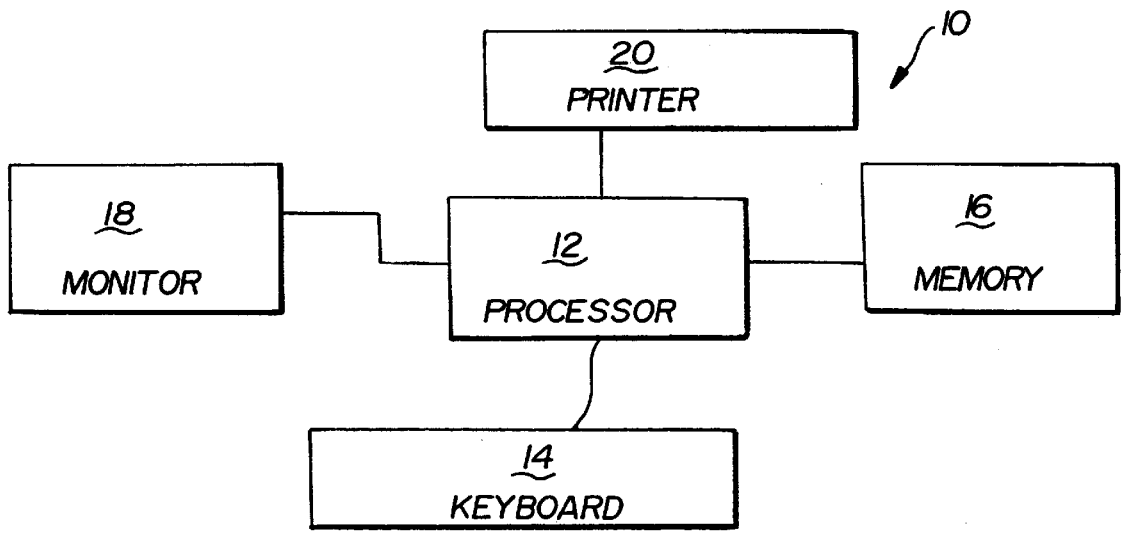
Fig-1
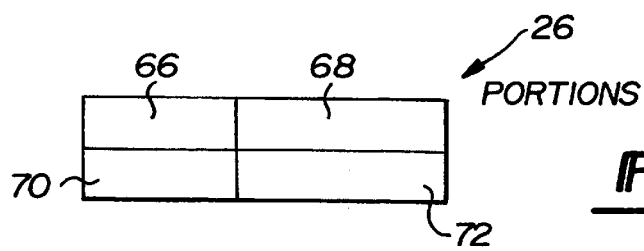
Fig-2
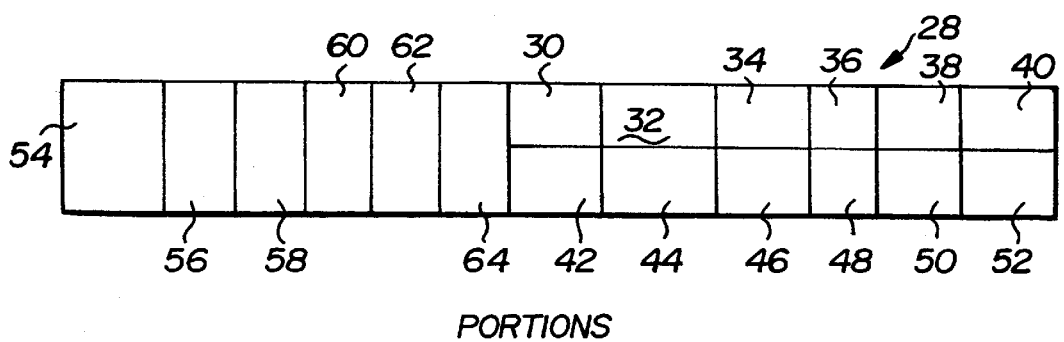

THERMAL ENERGY APPARATUS AND METHODOLOGY

FIELD OF THE INVENTION

This invention relates to a thermal energy apparatus and methodology, and more particularly, to a computer based thermal energy apparatus having at least one processor acting under stored program control and adapted to model, calculate, and/or measure/approximate the thermal energy occurring within an electronic or other type of active energy producing system according to a novel methodology.

DISCUSSION

Thermal energy apparatuses exist and are used to model, calculate, and/or measure the amount of thermal energy which is generated and/or transferred between components within a specific energy producing system or a number of such systems. As used throughout this Application, the term "model" or "modeling" refers to the act or process of building a numerical thermal model or "pre-processing." This includes, but is not limited to, constructing a geometry to be modeled, forming a mesh to be used in the numerical analysis, and applying certain boundary conditions and material properties to the model. The term "calculation" refers to the art of performing the numerical analysis necessary to produce/obtain the thermal results. The term "measurement" refers to "post processing" activity which includes, but is not limited to, displaying the results obtained by the calculation. Such "post processing" may include calculations necessary to derive result quantities (such as heat transfer coefficients) that are functions of the results obtained in the calculations procedure and may also include mathematical interpolations necessary to display the results in a relatively "smooth" manner. The term also includes the interaction with the computer (e.g. user interface and/or hardware) necessary to see the results and the procedures necessary to obtain a "hardcopy" of the results.

One example of such active energy producing systems in which such thermal energy calculations or models are deemed critical are electronic type systems. That is, as electronic manufacturers desire to greatly increase the speed of computation and the speed of other tasks which their electronic systems are to perform, there has been a great need to reduce the amount of physical space existing between individual board level components. That is, the electronic boards constituting these electronic systems are getting much more densely populated in order to allow much computing power to be placed upon a given board "footprint" or "form factor" and further allowing the amount or length of electron transfer to decrease, thereby greatly increasing overall system performance. Additionally, each of the board level components are becoming much more dense (e.g. more transistors per component) thereby causing each component to generate more thermal energy. The amount of power that a device, component, and/or collection of devices or components can handle is typically limited by various thermal considerations.

While these densely populated electronic boards and/or components allow for greater computational speed, the lack of physical buffer space between the individual board components and/or between various boards prevents the thermal energy, generated by the individual board level components and/or boards, to be quickly and efficiently transferred into the surrounding space, such as and without limitation air. Therefore, these densely populated boards, provide a thermal generation problem that must be overcome. This problem may result in board malfunctioning and product or component/device failure. Modeling of the thermal characteristics of these boards and components is therefore critical to ensuring that the cost and expenditure associated with preparing newly designed board/systems is not wasted due to the later discovered thermal problems of these products.

Many prior thermal energy modeling and measurement apparatuses exist which allow a designer of such thermal systems (e.g. electronic boards) to view or measure the amount of thermal energy transferred between components and/or between various elements of a system, or that energy which is inherent in and/or to the system. The term "system" as used in this Application refers to any tangible item or items which produce and/or transfer thermal energy. While these prior thermal modeling and measurement apparatuses generally and somewhat reliably allow calculations of energy transfers to be made, these prior systems have been found to be very complex, relatively costly, and prone to generating erroneous results due to the complexity of the equations and other processes required of these models. In fact, the great complexity of these apparatuses has caused many of these systems to be "shunned" or not widely used by various industries.

Therefore, there is a need to provide a thermal energy apparatus which overcomes the drawbacks of the prior art, which is relatively easy to use, and which provides and allows for a relatively efficient and reliable thermal energy calculation and model to be produced. Moreover, there is a further need to provide such an apparatus which has a wide variety of uses and applications and which may be used to model, calculate, and measure thermal transfers between components, boards, and/or between and/or within virtually any thermal energy producing/generating system. Nothing in this Application should be construed as restricting the use of Applicants' invention to any particular type of thermal energy producing system or apparatus. In fact, Applicants' invention may and does have a wide range of applicability, from single components to very complex thermal systems.

SUMMARY OF THE INVENTION

It is therefore a primary object of this invention to provide a thermal energy apparatus.

It is a second object of this invention to provide a thermal energy apparatus which overcomes the disadvantages of the prior art.

It is a third object of this invention to provide a thermal energy apparatus which overcomes the various drawbacks and disadvantages of the prior art and which allows thermal energy models to be relatively quickly and efficiently made and/or constructed for a wide variety of applications and/or systems, such as and without limitation, those systems represented by electronic boards.

It is a fourth object of this invention to provide a thermal energy apparatus which overcomes the various drawbacks and disadvantages of the prior art and which allows for relatively efficient modeling, calculations, and thermal measurements to be made of a wide variety of systems and/or components.

According to one aspect of the present invention, a thermal energy apparatus is provided. The apparatus comprises, in a first embodiment, both computer processor based hardware and software. More particularly, the apparatus of the preferred embodiment of the invention comprises a processor operating under stored program control which is effective to provide desired thermal energy measurement, modeling, and calculations and, more particularly, allows these activities to be done according to a new and novel methodology. Particularly, in one embodiment, this methodology, embodied within computer source code, allows various components, such as and without limitation electronics board level components, to be divided into a number of discrete finite volumetric type portions (other types of discrete portions may be utilized) over which and/or by which these thermal calculations are made. In the preferred methodology of this invention, each of these discrete components may be used for convection or conduction analysis, according to a standard and/or known calculation methodology. Each of these discrete element components, according to Applicant's novel methodology, are later selectively merged for purposes of conducting a radiation calculation. Applicant has found that by allowing this selective merger of these previously constructed discrete portions to occur, the radiation heat transfer, which is a highly non-linear process; and hence, a complex and time intensive calculation, may be made in a relatively quick, efficient, and reliable manner.

According to a second aspect of the present invention, a computer based apparatus of the preferred embodiment of this invention is provided. The apparatus, operating under stored program control, employs a novel methodology of the invention and allows a user to select portions of the system upon which thermal modeling, calculations, and/or measurements are to be made. These initially selected portions are allowed to be fixed in the model of the system and further elements, such as and without limitation, an amorphous solution such as potting solution, is and are allowed to be placed within the system without affecting, in a detrimental manner, the fixation of the originally created discrete thermal generating elements. In this manner, a user or designer of such thermal systems may quickly and easily construct desired system modeling elements and place and/or create the environment surrounding these initially constructed elements in an efficient manner.

Further objects, features, and advantages of the present invention will become apparent from a consideration of the following description and the appended claims, when taken in conjunction with the accompanying drawings.

BRIEF DESCRIPTION OF THE DRAWINGS

FIG. 1 is a block diagram of a computer based thermal calculation and measurement apparatus made in accordance with the preferred embodiment of this invention;

FIG. 2 is a block diagram of portions of an electronic board which are discretely analyzed in accordance with the methodology embodied in the computer apparatus of FIG. 1;

DETAILED DESCRIPTION OF THE INVENTION

Figure 3:
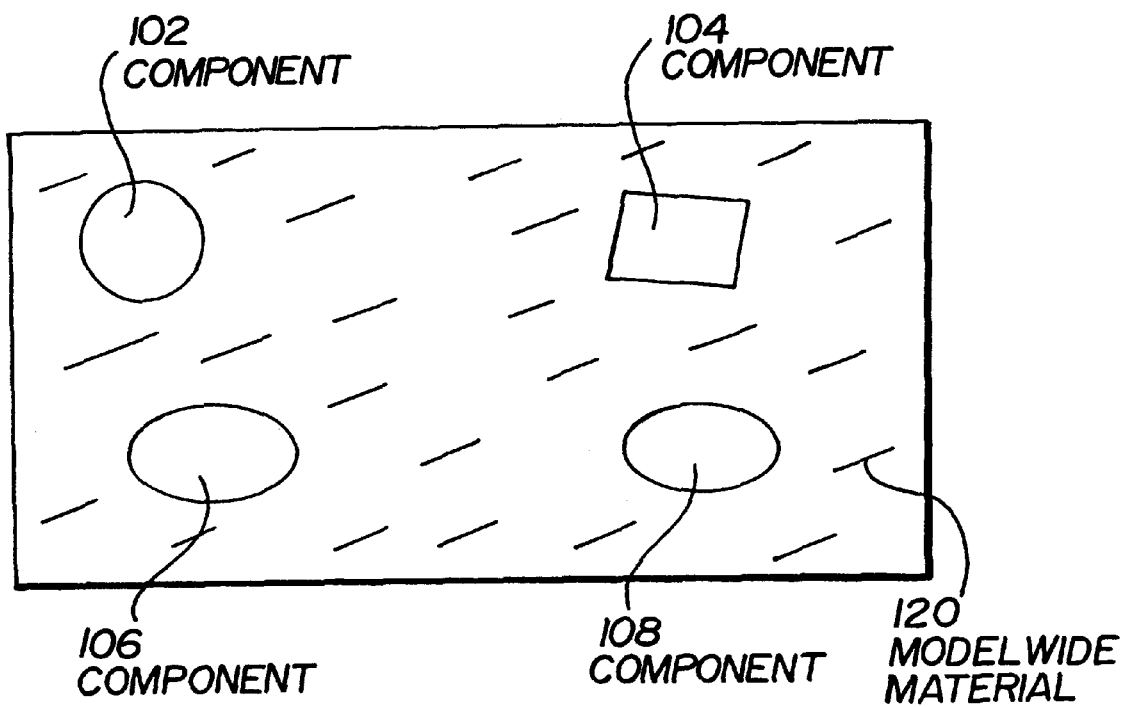
FIG. 3 is a perspective view of a measured and modeled system done in accordance with the preferred methodology of this invention as embodied in the apparatus of FIG. 1.

Referring now to FIG. 1, there is shown a computer based thermal energy apparatus 10, made in accordance with the preferred embodiment of this invention and utilizing the methodology of the invention. Apparatus 10, in a first embodiment of the invention, includes a computer processor 12 which, in one embodiment, comprises a commercially available and conventional computer, such as an IBM compatible computer, utilizing a commercially available and conventional operating system, such as and without limitation a Windows® operating system. Computer processor 12 is physically and communicatively coupled to keyboard 14, to a memory portion 16, to a monitor 18, and to a printer 20. In the preferred embodiment of this invention, the preferred methodology associated with the modeling, measurement, and calculation of thermal characteristics of various systems is embodied within computer code which is selectively stored within memory portion 16, utilized by processor 12. The results and/or model is and are displayed upon monitor 18, and the model, results, and/or calculations may be selectively printed in order to make a hard copy upon printer 20. Apparatus 10 may be better understood from a reading of the text entitled *Advanced Computer Architecture*, written by Kai Hwang (McGraw-Hill 1993) having a library reference number ISBN-0-07-031622-8, which is fully and completely incorporated herein by reference word for word and paragraph for paragraph. To understand the teachings of the invention, and more particularly the methodology of the invention, reference is now made to FIGS. 2–5.

Referring now to FIG. 2, there is shown a system thermal model 24 made in accordance with the teachings of the preferred embodiment of this invention. In this first system model 24, components 26 and 28 are selectively and discretely partitioned into several element type portions 30, 32, 34, 36, 38, 40, 42, 44, 46, 48, 50, 52, 54, 56, 58, 60, 62, 64, 66, 68, 70, and 72. It should be apparent to one of ordinary skill in the art that this discrete partitioning of components 26 and 28 is done in order to allow a numerical analysis to be accomplished upon the surface of each of these elements in order to perform conductive and convection analysis. This thermal methodology, as should also be known to one of ordinary skill in the art, may be used to provide conduction, convection, and/or radiation thermal analysis of the heat generated by and between these elements. These conventional conductive and convection analyses which may be used in Applicant's invention are described, for example, in the texts entitled *Numerical Heat Transfer and Fluid Flow*, authored by Suhas Patankar, published by Hemisphere Publishing Corporation (1980), having a library reference number ISBN 0-89116-522-3 and *Computational Heat Transfer*, authored by Yogesh Jaluria, published by the Hemisphere Publishing Corporation (1986), having a library reference number ISBN 0-89116-286-0, which are each fully and completely incorporated herein by reference, word for word and paragraph for paragraph.

Applicant's preferred embodiment of this invention, as illustrated within the apparatus shown in FIG. 1, also selectively uses this disclosed and conventional numerical analysis methodology to provide conduction and convection models, calculations, and measurements. However, according to Applicant's invention, the radiation portion or calculation of the overall thermal system analysis is done in a new and novel way which allows a user to selectively obtain and/or provide a radiation model in a highly simplified but relatively accurate manner. Previously, the only way that such radiation calculations were completed, based upon Applicant's knowledge, were by means of a highly complex methodology which was prone to error, required a relatively large amount of processor and computer resources, and required a large amount of data to be gathered and entered by the user. The requirements of this calculation made the system difficult to use and prone to error.

Applicant's preferred embodiment of this invention allows these elements 26 and 28 to be modeled in a new and different way. This is, for instance, as to element 28, (or any other element in the system model), the partitioning represented by portions 30–62, for purposes of the radiation calculation, is and/or may be selectively dispensed with by merging some or all of these portions 30-62 into fewer portions. That is, element 28 may, in Applicant's preferred embodiment of this invention, have only one or a few such merged partitions 30–62 and the radiation calculation, done within processor 12, is accomplished by way of elements having only a relatively few partitions. In this manner, Applicant has found that the radiation calculation aspect or portion of the thermal radiation modeling and measurement, may be done in an efficient, reliable manner without the need for the complexity required of these prior systems. The use of this simplified radiation approach and the concomitant recognition that such a simplified approach would yield such acceptable radiation results is a significant aspect of Applicant's invention. Similarly, element 24 may also have the element portions 66–72 merged into a single or a very few partitions. In this manner, Applicant's invention allows for the radiation analysis to be done in a highly simplified manner without an appreciable degradation in the overall thermal model. Applicant believes that he is the first to recognize the accurate results obtained by this simplified radiation modeling approach. It should also be realized that Applicant's invention allows a system user to selectively use all of the plurality of elements 30–72 in the radiation calculation if desired, according to the conventional methodology described in the fully incorporated texts. In this manner, Applicant's system allows a user full flexibility.

Figure 4:
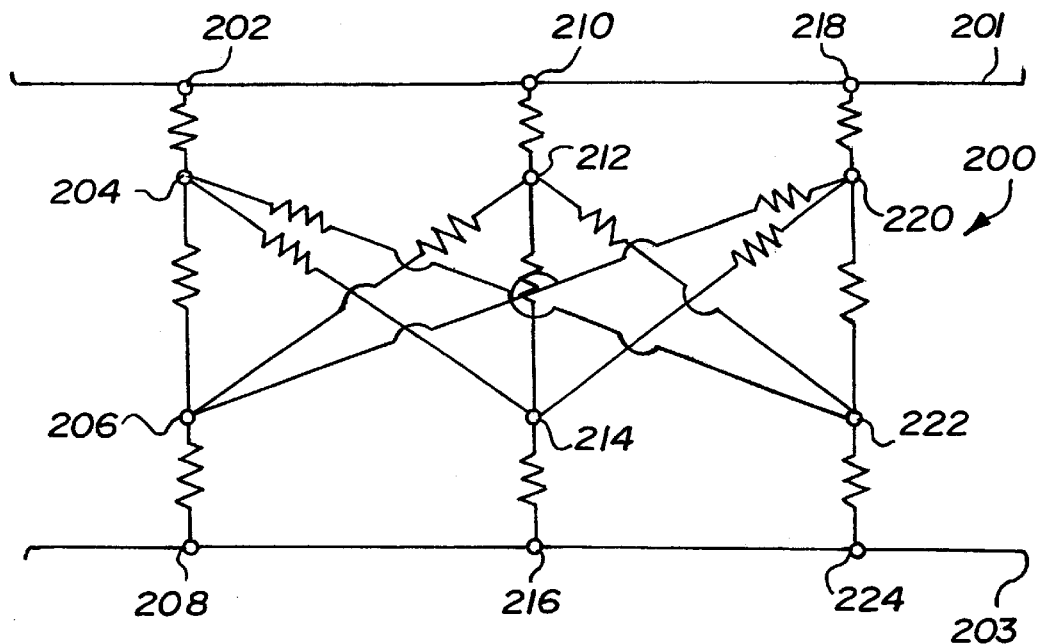
FIG. 4 is a schematic diagram of a radiosity network used by the apparatus and methodology of the invention.
Figure 5:
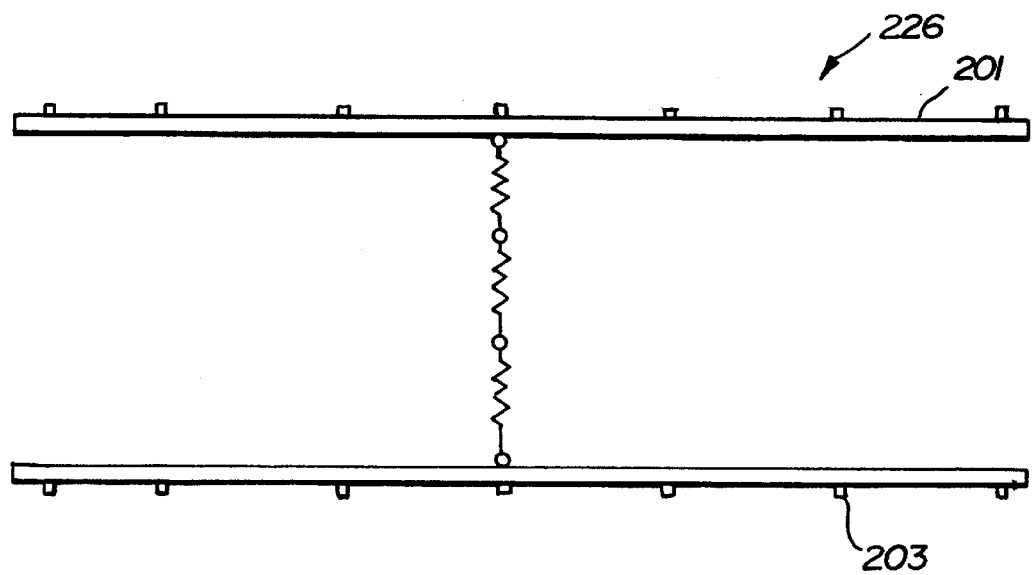
FIG. 5 is a schematic diagram of a simplified radiosity network used by the apparatus and methodology of the invention.

The novelty of Applicant's methodology should be apparent from a review of FIGS. 4 and 5. As shown in FIG. 4, conventional radiosity network 200, as used in the Applicant's invention, includes surfaces 201, 203 which may respectively correspond to surfaces or elements 26, 28 which are connected through a resistive network comprised of a plurality of elements 202–224 which are resistively connected within the model. As should be apparent to one of ordinary skill in the art such resistive connections model or relate to the thermal energy flow by and between connected elements. Moreover, this network gives rise to a plurality of mathematical equations which must be solved in order to have the thermal characteristics modeled or approximated. Applicant's invention, as described above, allows these connections to be selectively merged and/or eliminated as shown in the network 226 of FIG. 5. Specifically, a radiosity network 200 is formed from element partitions 202–224 created in the modeling process. The surface partitions 202–224 created may coincide with the element faces forming the solid boundaries or may be made more "coarse" (i.e. larger), at the user's discretion. The advantage of making the surfaces larger is that a simplified radiosity network 226 is formed resulting in a substantially smaller set of equations to be solved. Hence, one of the major benefits of Applicant's invention is that less time is required to obtain a radiation modeling solution corresponding to the modeled system. Once the radiative heat exchange has been calculated from this simplified radiosity network, this heat flux is then distributed appropriately (e.g. in one embodiment equally) to any elements 30–72 contained in the radiation surface 26,28. This procedure provides the user with the flexibility of deciding and controlling how refined the radiosity network needs to be in order to provide an accurate solution.

Referring now to FIG. 3, there is shown a model of the system 100 which may appear on monitor 18. In this model, as is conventional to thermal engineering apparatuses, various components 102, 104, 106, and 108 may be displayed upon the screen and initially fixated into a created thermal model. These initially selected or fixated elements may be either selectively overridden (e.g. erased) by later created or overlaid elements or remain in the model to the exclusion of any later created element which was placed in the same model space or position as the first created element. Thus, a user may construct a thermal model by creating entities or elements, such as and without limitation, walls, printed circuit boards, and/or components in any desired order. If a new object lies entirely or partially "on top of" the previously created object, the user may decide which object takes precedence.

One example is that the user may create a board with components on it and then decide that he wants to look at the effect of placing a potting solution over everything. He simply specifies a fill depth of the potting solution; and, by selecting the original objects to take precedence over the "new" potting solution, the component and board definitions are preserved while any available volume surrounding them is assigned the material attributes of the potting solution. Similarly, a solid object could be placed on top of a previously created object. The user may decide which object takes precedence. Current practice is to overwrite the definition of any object with the last object placed on top of it. Applicant's thermal modeling apparatus and methodology also allows for these elements to be similarly fixated and created within a model. Hence, unlike the previous prior art system, Applicant's apparatus allows for an amorphous liquid such as potting solutions 120 or other "model wide" material (even a "solid") to be placed within the model, after the elements 102–108 are fixated or created within the model. Applicant's novel apparatus and methodology allows this model wide material, such as amorphous liquid, to fill all available space without overriding the previously created elements. In one embodiment this may be done by storing the physical locations occupied by the initially created elements within memory 16 and preventing the data (element information) stored within these memory locations from being overridden. That is, space not taken by these elements 102–108. in this manner, Applicants' claimed invention allows for amorphous potting solutions and other types of model wide solutions or elements to be quickly and easily placed within the model without the need to do this on a first basis and then have the individual elements override the solution. Moreover, Applicants' invention also allows for overriding placement to be accomplished, if desired, by user of the system.

Applicant has therefore disclosed a new and novel thermal energy apparatus and methodology. The described measurement, modeling, and calculation system, unlike the prior art, allows for the radiation portion of the thermal calculations to be done by dispensing with and/or selectively eliminating all of the individual partitions of individual elements, thereby allowing for a relatively quick and easy radiation calculation and/or modeling to be accomplished. This selective merging, dispensing or eliminating of the elements has been found by Applicant to produce a new and novel result since this simplified radiation calculation and/or modeling not only is reliable, but has been found by Applicant to be highly accurate. Additionally, in a second aspect of the invention, Applicant's thermal engineering apparatus and methodology invention allows for amorphous potting solutions and other system wide elements to be added after the individual elements (e.g. board components) are created and fixated within the model without detrimentally affecting the modeling of these individual elements.

It is to be understood that the invention is not limited to the exact construction or methods illustrated and described above, but that various changes and modifications may be made without departing from the spirit of the invention as defined in the following claims.

I claim:

1. A method for allowing thermal measurements to be made of various components said method comprising the steps of creating at least one volumetric portion for each of the various components; selecting certain of said volumetric portions; merging said selected certain volumetric portions; and making thermal measurements based upon said merged volumetric portions.

* * * * *